(12) United States Patent
Park et al.

(10) Patent No.: US 6,473,549 B1
(45) Date of Patent: Oct. 29, 2002

(54) MULTI-STAGE FIBER AMPLIFIER WITH FLATTENED GAIN CURVES

(75) Inventors: Nam-Kyoo Park, Seoul (KR); Ju-Han Lee, Suwon-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/424,491

(22) PCT Filed: Sep. 28, 1998

(86) PCT No.: PCT/KR98/00298

§ 371 (c)(1),
(2), (4) Date: Jun. 13, 2000

(87) PCT Pub. No.: WO99/18476

PCT Pub. Date: Apr. 15, 1999

(30) Foreign Application Priority Data

Oct. 2, 1997 (KR) .............................. 97-51051

(51) Int. Cl.[7] .............................. G02B 6/16; G02B 6/26; H01S 3/067
(52) U.S. Cl. .............................. 385/123; 385/27; 372/6; 359/341.1
(58) Field of Search .............................. 385/15, 27, 123; 372/6; 359/332, 333, 341, 124, 341.1

(56) References Cited

U.S. PATENT DOCUMENTS 5,115,338 A * 5/1992 DiGiovanni et al. ........ 372/6 X
5,808,787 A * 9/1998 Meli et al. ................... 359/341
5,880,874 A * 3/1999 Shibuya et al. ......... 359/341 X
5,912,750 A * 6/1999 Takeda et al. .............. 359/124

FOREIGN PATENT DOCUMENTS

EP  0 793 123 A1  9/1997

OTHER PUBLICATIONS

Toba et al, "A 100–Channel Optical FDM Six–Stage In–Line Amplifier System Employing Tunable Gain Equalizers", IEEE Photonics Technology Letters, vol. 5, No. 2, Feb. 1993, pp. 248–251,.*

Chinese Office Action for Chinese Appln. No. 98802107.2 dated Apr. 19, 2002.

* cited by examiner

Primary Examiner—John D. Lee
(74) Attorney, Agent, or Firm—Dilworth & Barrese, LLP

(57) ABSTRACT

A multi-stage optical amplifier for use in the transmission of optical signals over fiber when using Wavelength Division Multiplexing. Wavelength Division Multiplexing is particularly sensitive to differences in gain between channels and these differences become critical when cascaded fiber amplifiers are used to boost the signal over long distances. The present amplifier flattens the differences in gain and reduces noise figure by using multi-stage equalizing filters along the length of the transmission fiber.

4 Claims, 7 Drawing Sheets

MULTI-STAGE FIBER AMPLIFIER WITH FLATTENED GAIN CURVES

BACKGROUND OF THE INVENTION

1. Field of the Invention

The present invention relates to a fiber amplifier, more particularly to a multi-stage erbium doped fiber amplifier with flattened gain curves and reduced noise figure when incorporating a gain flatness filter for Wavelength Division Multiplexing (WDM) applications.

2. Description of the Related Art

It has long been recognized that fiber amplifiers are an attractive alternative for amplifying optical signals. For example, fiber amplifiers have been proposed for the use as a booster amplifiers to increase the output power from telecommunication optical transmitters or as telecommunication repeaters to amplify optical signals, thus avoiding the step of converting the optical signals into electrical signals.

Especially, the advent of the Erbium Doped Fiber Amplifier (EDFA) has had a profound impact on the design, manufacturing and performance of optical communication systems. Its low noise, high optical power, high gain, linearity, wide bandwidth, wavelength transparency, polarization independence and fiber compatibility have revolutionized optical communications by effectively removing the transmission and splitting loss barriers. As a result today, long haul terrestrial and transoceanic fiber communications, as well as local and wide area networks, have become realities.

However, the flatness of the EDFA pass-band becomes a critical issue in Wavelength Division Multiplexing (WDM) systems with cascaded amplifiers. When the pass-band is not flat, the amplifier gain is not exactly the same at each wavelength.

For example, in the width of one of 0.8 nm channel, one EDFA can simultaneously amplify optical signals from approximately 50 WDM channels. However, if several EDFAs are connected in series for long-distance transmission, the overall amplification becomes less and less flat, showing the problem of insufficient amplification at the edge of amplification peak. Even small variations in gain between channels in a stage can cause large variations in the power difference between channels at the output of the chain, lowering the performance of the entire system.

In general, the performance of an optical amplifier is determined by its design parameters such as gain, output power and noise figure. Noise figure is defined as an amplifier output signal to noise ratio, scaled by the signal to noise ratio at the input port of the optical amplifier. When optical amplifiers are used as telecommunication repeaters, high power and low noise become critical parameters in increasing the distance between adjacent repeaters.

The importance of a wavelength-independent (flat) gain in EDFAs is of great interest, as manifested by the large current research effort in the field, since it is directly related to the transmission capacity of dense WDM systems. Fluoride-based EDFAs and tellurite-based EDFAs have been shown to achieve wider flattened bandwidth. Such a research result can be found in M. Yamada et al., "Low-noise and gain-flattened fluoride-based $Er^{3+}$-doped fiber amplifier pumped by 0.97 um laser diode," Electron. Lett., vol.33, no.9, p.809, 1997, and in A. Mori et al., "1.5 um broadband amplification by tellurite-based EDFAs," OFC'97, PD1-1, 1997. It was also shown that flattened bandwidth beyond 40 nm could be obtained by using long-period fiber-grating (LPFG) filter careful design of the EDFA is required because LPFG filter insertion in the mid stage of the EDFA can produce a noise figure penalty, as is described in P. F. Wysocki et al., "Erbium-doped fiber amplifier flattened beyond 40 nm using long-period grating," OFC'97, PD2-1, 1997.

In FIGS. 1 and 2 the dependence of the noise figure on filter transmission is analytically derived through a numerical simulation.

FIG. 1 schematically shows the configuration of the EDFA which was used for the simulation. The EDFA uses a single-stage equalizing filter according to the prior art.

Referring to FIG. 1, a single stage filter 10 is located at the ⅓ position of total fiber amplifier length L. A long-period fiber grating (LPFG) is used as the single stage filter 10. The amplifier was modeled as a homogeneously broadened three level system as was described in C. R. Giles et al., "Propagation of signal and noise in concatenated EDFAs," J. Lightwave Technol., vol.9, no.2, p.147, 1991. A spectral range of 120 nm between 1480 nm and 1600 nm was used with a spectral grid of 0.1 nm to cover the pump wavelength of 1480 nm. The fiber amplifier was assumed to be a silica based aluminum co-doped fiber and then the absorption cross section was taken from the value disclosed in N. Kagi et al., "Temperature dependence of the gain in erbium-doped fibers," IEEE J. Lightwave Technol., vol.9, no.2, p.261, 1991. The emission cross section was calculated from McCumber theory.

FIG. 2 shows the detailed spectral profile of the LPFG in the single-stage equalizing filter of FIG. 1.

FIG. 3 shows the output spectrum of the EDFA described in FIG. 1. Forty-one input signals of 0.8 nm spacing between 1531 nm and 1563 nm were used to observe gain flatness and noise figure, at −20 dBm input power for each channel. The achieved multi-channel gain flatness was within 0.4 dB over a 32 nm spectral range, and signal gain per channel was around 23 dB. Even though this configuration displays good gain flatness, the amplified spontaneous emission (ASE) in this amplifier is not regular due to the high noise figure in the short wavelengths, making the application of this amplifier to noise sensitive applications such as long distance links difficult.

SUMMARY OF THE INVENTION

Therefore, it is an object of the present invention to provide a high performance flat-gain fiber amplifier.

It is another object of the present invention to provide a fiber amplifier with lower noise figure.

In order to accomplish these and other objects, the present invention provides a multi-stage optical fiber amplifier that achieves ultra-flat gain using multi-stage equalizing filters. The fiber amplifier of the present invention comprises at least three fiber amplifier stages, each of which includes a length of doped optical fiber. The amplifier stages are connected in series for the sequential amplification of the optical signals input to the first amplifier stage. One of the amplifier stages is provided with pumped radiation so as to support laser amplification therein. The fiber amplifier also includes at least two equalizing filters, each of which is located between each pair of said amplifier stages.

Since the noise figure is inversely proportional to the first-stage equalizing filter transmission, noise figure can be lowered by splitting the equalizing filter into multiple stages.

Furthermore, since the output power of the amplifier is inversely proportional to the end-stage equalizing filter transmission, careful adjustment of the transmission spectra of each filter is necessary.

BRIEF DESCRIPTION OF THE DRAWINGS

The detailed description particularly refers to the accompanying drawings in which.

DETAILED DESCRIPTION OF THE PREFERRED EMBODIMENT

Figure 4:
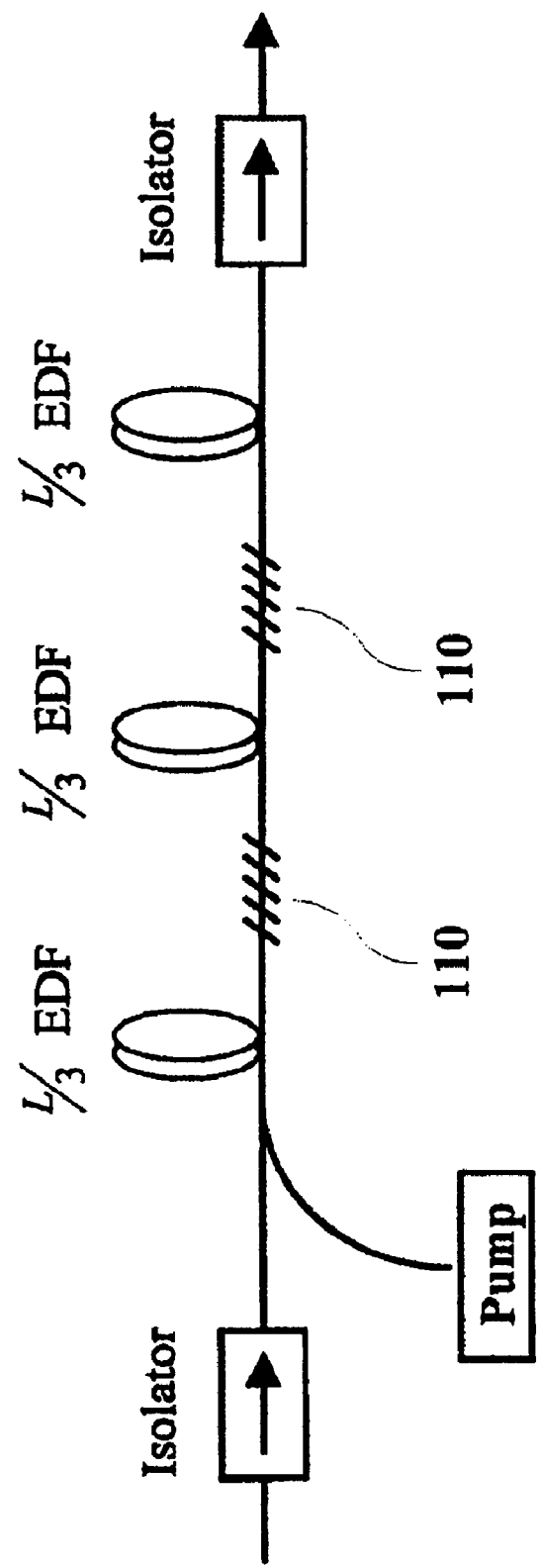
FIG. 4 is a schematic diagram of the configuration of the EDFA according to an embodiment of the present invention.

Referring to FIG. 4, a LPFGs 110 is located at both the ⅓ and ⅔ positions of total fiber amplifier length L. For the double stage filter configuration comprising two LPFGs, the gain of each flattening filter is the square root of the total filter gain. The fiber amplifier employed a silica-based aluminum co-doped EDF(erbium doped fiber). The EDF is pumped at 1480 nm by a semiconductor laser that is used as an optical pump.

Figure 1:
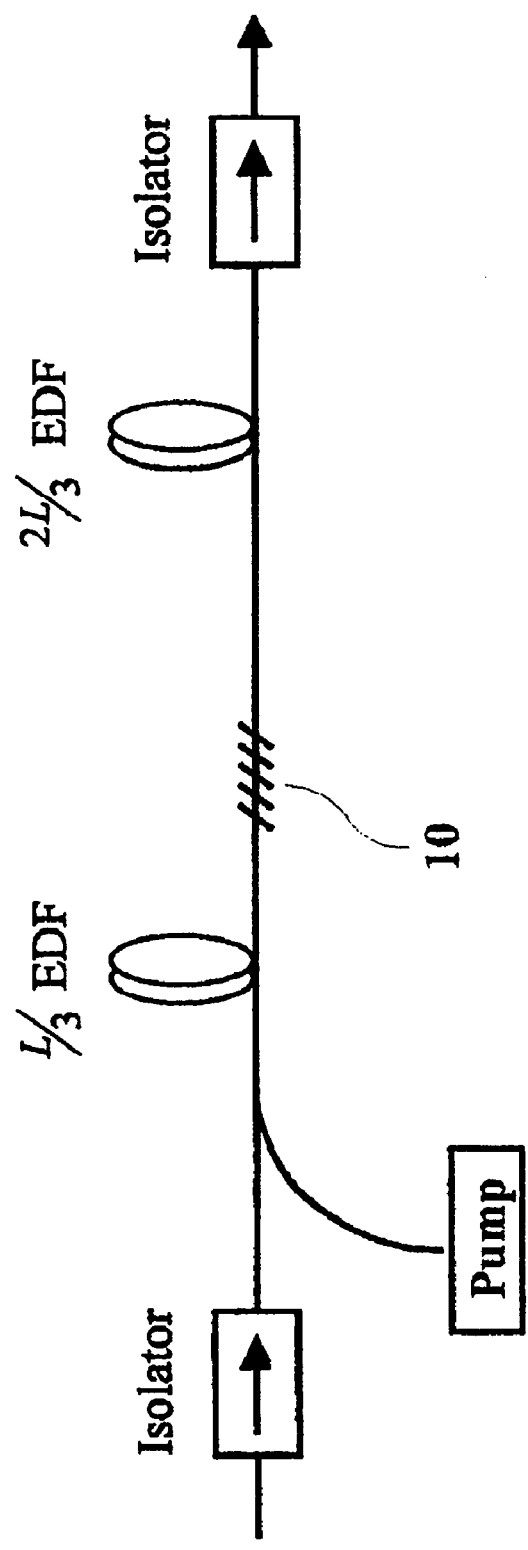
FIG. 1 is a schematic diagram of the configuration of an EDFA with a single-stage equalizing filter according to the prior art.
Figure 2:
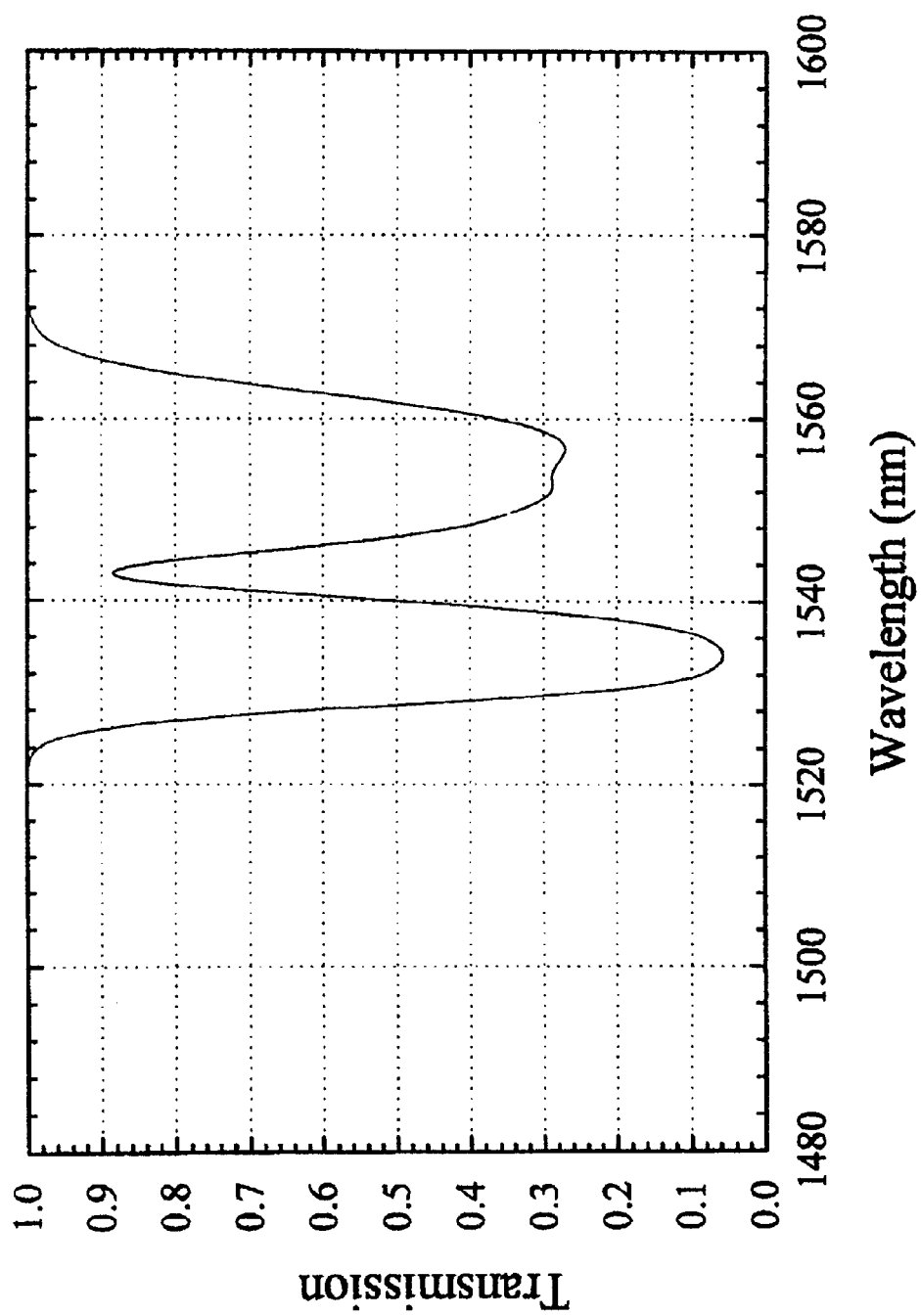
FIG. 2 shows the detailed spectral profile of the LPFG in the single-stage equalizing filter of FIG. 1.
Figure 5:
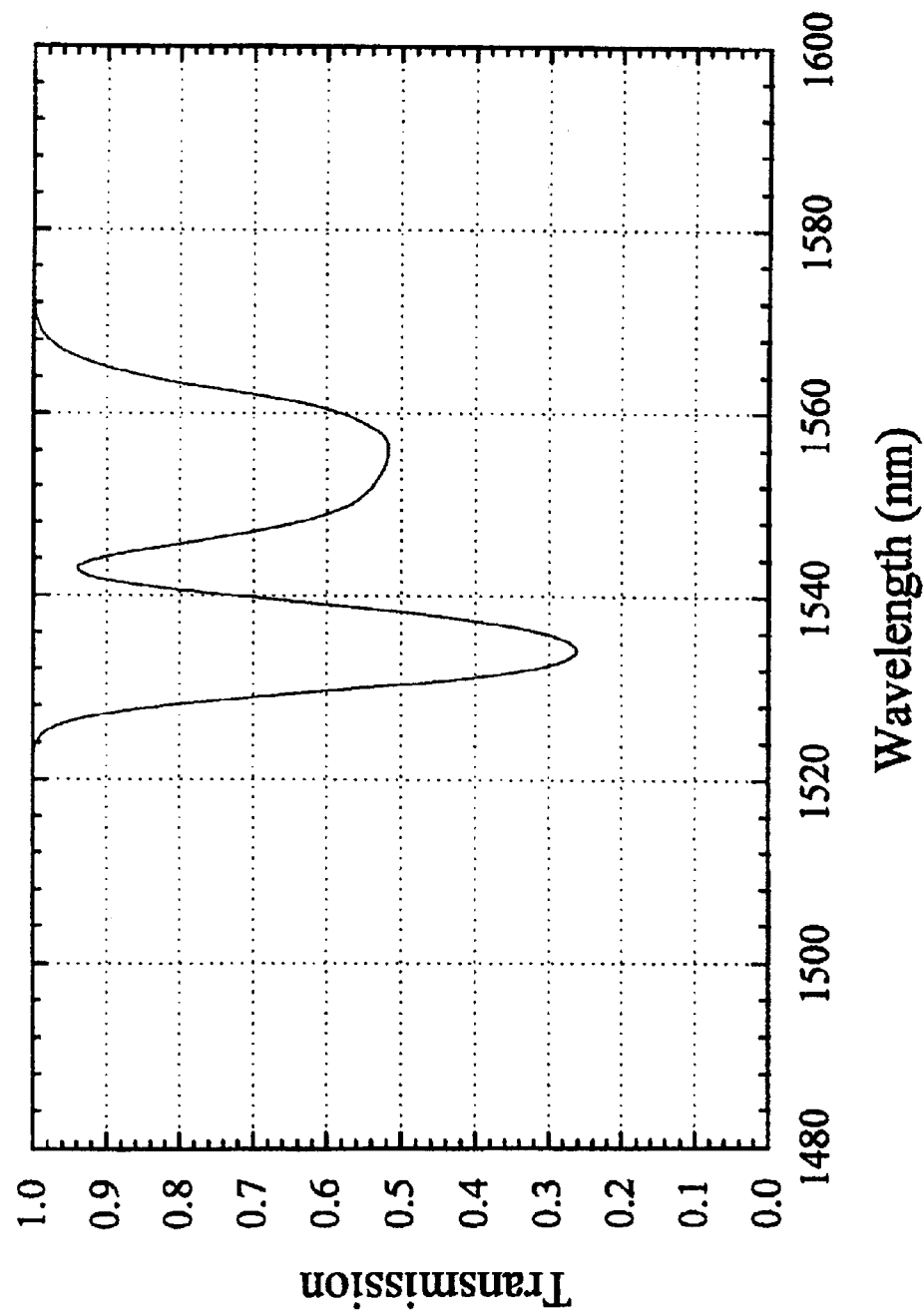
FIG. 5 shows the detailed spectral profile of the LPFGs in the double-stage equalizing filters of FIG. 4.

Referring to FIG. 5, the LPFGs show a notch filter characteristic. The absorption peak positions are the same as those of FIG. 2. However, the depth profile of the notches is different.

Figure 3:
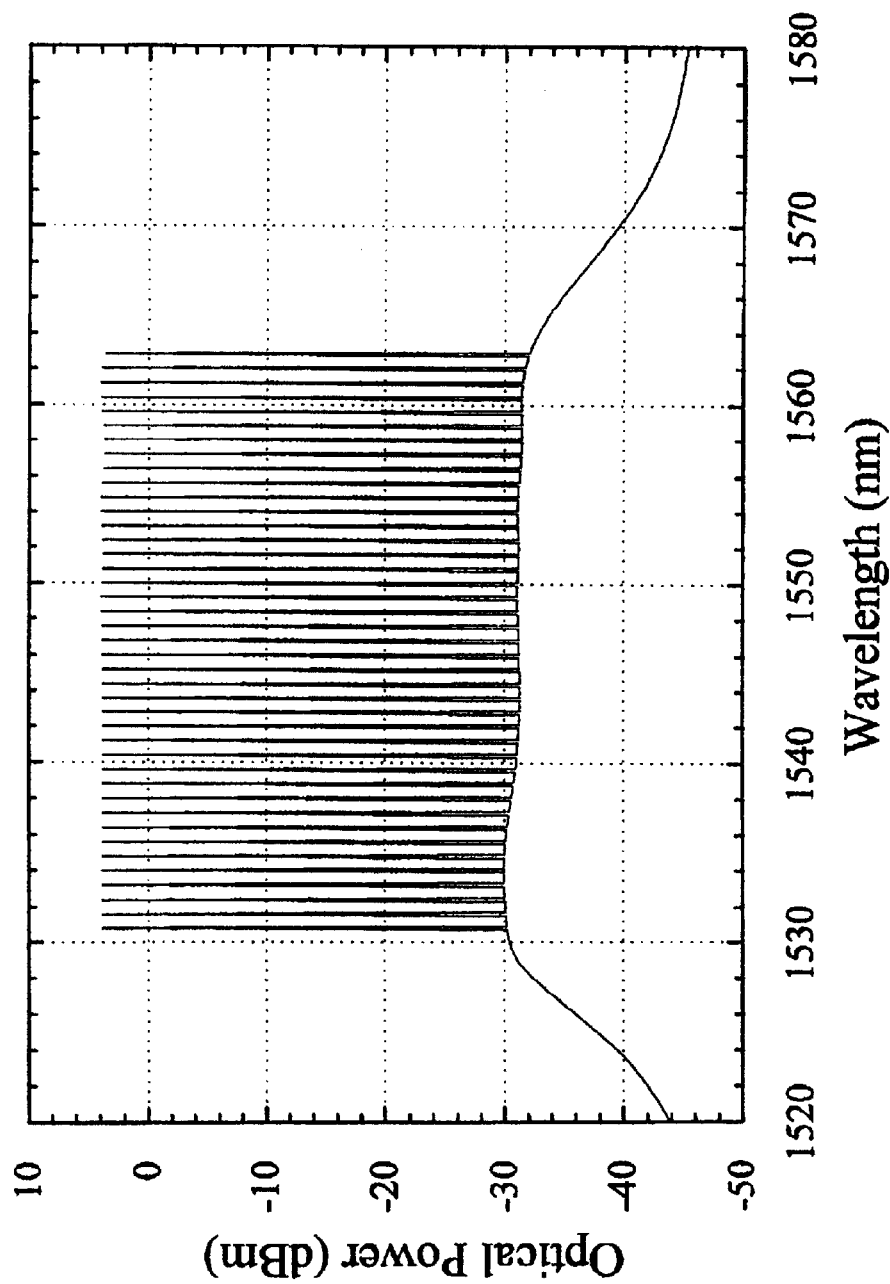
FIG. 3 shows the output spectrum of the EDFA in FIG. 1.
Figure 6:
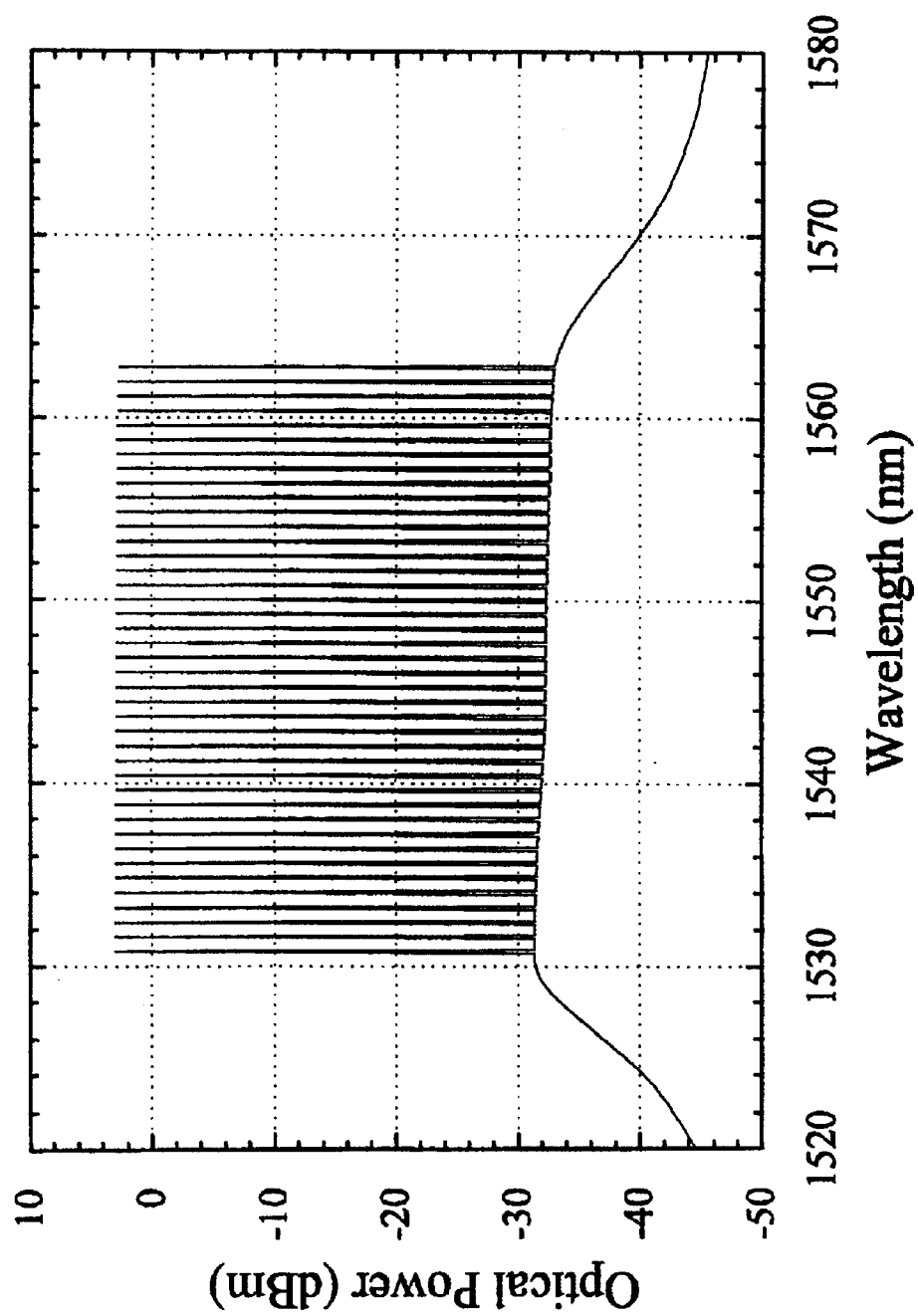
FIG. 6 shows the output spectrum of the EDFA in FIG. 4.

Referring to FIG. 6 and FIG. 3, the output signal power and ASE power of the EDFA employing a single stage filter is stronger than those of the EDFA employing a double stage filter by 1 dB. However, the ASE power spectrum in a single stage filter is less regular, compared with that in a double stage filter, implying a higher noise figure penalty.

Figure 7:
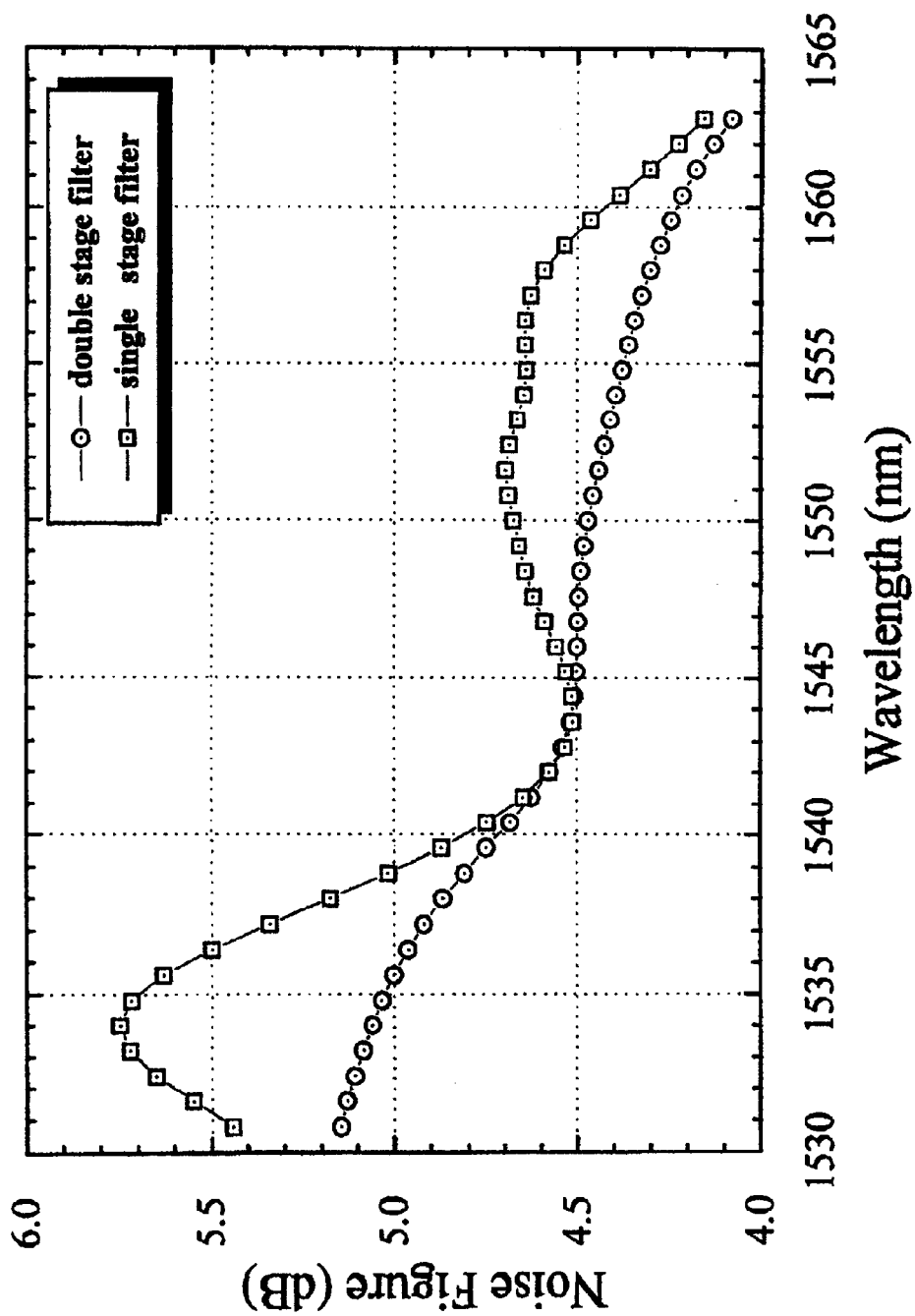
FIG. 7 shows calculated noise figures of EDFAs with two kinds of equalizing filters.

Calculated noise figures of EDFAs with both kinds of equalizing filters are plotted in FIG. 7. Referring to FIG. 7, maximum noise figure difference of 0.7 dB is found at the wavelength of 1535 nm where the ratio of filter output to input, as shown in FIG. 5 is a minimum. Not much difference in noise figure is observed at 1543 nm where the filter output/input ratio is maximum.

From these results, it is concluded that the EDFA with a double stage equalizing filter is superior to that with a single stage filter in terms of noise figure, though using a multi-stage equalizing filter decreases the EDFA gain a small amount.

What is claimed is:

1. A multi-stage optical fiber amplifier, comprising: at least three doped optical fibers being connected in series for sequential amplification of optical signals provided to a first of said doped optical fibers;

means for providing forward pumping radiation into the first of said doped optical fibers so as to support laser amplification therein, wherein said forward pumping radiation sequentially passes through said doped optical fibers; and at least two equalizing filters, each of which is located between adjacent doped optical fibers.

2. The multi-stage optical fiber amplifier of claim 1, wherein each of said equalizing filters is a long-period fiber grating filter.

3. The multi-stage optical fiber amplifier of claim 1, wherein said optical fiber is doped with a rare earth element.

4. The multi-stage optical fiber amplifier of claim 3, wherein said rare earth element is erbium.

* * * * *